(12) United States Patent
Tsuda et al.

(10) Patent No.: US 10,995,728 B2
(45) Date of Patent: May 4, 2021

(54) WIND POWER GENERATION SYSTEM INCLUDING A ROTATING PEDESTAL AND A WIND POWER GENERATION APPARATUS WITH A DUCT

(71) Applicant: Kuninori Tsuda, Taito-ku (JP)

(72) Inventors: Kuninori Tsuda, Tokyo (JP); Yoshihisa Koto, Tokyo (JP)

(73) Assignee: Kuninori Tsuda, Tokyo (JP)

( * ) Notice: Subject to any disclaimer, the term of this patent is extended or adjusted under 35 U.S.C. 154(b) by 0 days.

(21) Appl. No.: 16/607,466

(22) PCT Filed: Mar. 15, 2018

(86) PCT No.: PCT/JP2018/010337
§ 371 (c)(1),
(2) Date: Oct. 23, 2019

(87) PCT Pub. No.: WO2018/198580
PCT Pub. Date: Nov. 1, 2018

(65) Prior Publication Data
US 2020/0049126 A1 Feb. 13, 2020

(30) Foreign Application Priority Data
Apr. 27, 2017 (JP) .............................. JP2017-088557

(51) Int. Cl.
*F03D 1/04* (2006.01)
*F03D 7/04* (2006.01)
*F03D 9/25* (2016.01)

(52) U.S. Cl.
CPC ................. *F03D 1/04* (2013.01); *F03D 7/04* (2013.01); *F03D 9/25* (2016.05); *F05B 2240/133* (2013.01)

(58) Field of Classification Search
CPC . F03D 1/04; F03D 7/0204; F03D 7/04; F03D 9/25; F05B 2240/133; F05B 2270/321; F05B 2270/335; Y02E 10/723
(Continued)

(56) References Cited

U.S. PATENT DOCUMENTS 2,191,341 A * 2/1940 Curley .................. F04D 19/002
                                                                415/207
2,563,279 A * 8/1951 Rushing .................... F03D 1/04
                                                                  415/4.3
(Continued)

FOREIGN PATENT DOCUMENTS

CN          101415939 A      4/2009
CN          201339542 Y      11/2009
(Continued)

OTHER PUBLICATIONS

International Search Report issued in International Patent Application No. PCT/JP2018/010337, dated Jun. 12, 2018 (with English translation).
(Continued)

*Primary Examiner* — Tulsidas C Patel
*Assistant Examiner* — S. Mikailoff
(74) *Attorney, Agent, or Firm* — Greenblum & Bernstein, P.L.C.

(57) ABSTRACT

Provided is a wind power generation system including: a wind power generation apparatus that includes at least a duct having a longitudinal cross section formed in a substantial streamline shape, the longitudinal cross section being cut along a central axis, an impeller placed in the duct, and a power generator that generates power by rotation of the impeller; an anemovane installed so as to be able to measure a wind direction and/or wind power in a vicinity of the wind power generation apparatus; a rotating pedestal that supports (Continued)

the wind power generation apparatus so as to be rotatable along a supporting surface; and a control device that controls a rotational angle of the rotating pedestal based on the wind direction and/or the wind power measured by the anemovane.

11 Claims, 5 Drawing Sheets

(58) Field of Classification Search
USPC .................................................. 290/44, 55
See application file for complete search history.

(56) References Cited

U.S. PATENT DOCUMENTS

| | | | | |
|---|---|---|---|---|
| 3,883,750 | A * | 5/1975 | Uzzell, Jr. ................. | F03D 1/04 290/55 |
| 4,021,135 | A * | 5/1977 | Pedersen ................... | F03D 1/04 415/208.2 |
| 4,140,433 | A * | 2/1979 | Eckel ........................ | F03D 1/04 415/209.1 |
| 4,204,799 | A * | 5/1980 | de Geus .................... | F03D 1/04 415/4.5 |
| 4,324,985 | A * | 4/1982 | Oman ....................... | F03D 1/04 290/55 |
| 6,246,126 | B1 * | 6/2001 | Van Der Veken ........ | F03D 1/04 290/55 |
| 6,836,028 | B2 * | 12/2004 | Northrup ............... | H02K 7/183 290/44 |
| 8,633,609 | B2 * | 1/2014 | Cornelius ................ | E02B 9/00 290/54 |
| 9,777,707 | B2 * | 10/2017 | Williams ............... | F03D 7/0204 |
| 2006/0171798 | A1 | 8/2006 | Yamamoto et al. | |
| 2007/0009348 | A1 | 1/2007 | Chen | |
| 2008/0084068 | A1 * | 4/2008 | Shibata ................. | F03D 7/0204 290/44 |
| 2009/0047129 | A1 | 2/2009 | Yoshida | |
| 2011/0204632 | A1 | 8/2011 | Skala | |
| 2011/0204634 | A1 * | 8/2011 | Skala ........................ | F03D 1/04 290/44 |
| 2011/0304142 | A1 | 12/2011 | Baker | |
| 2012/0038157 | A1 * | 2/2012 | Skala ........................ | F03D 1/04 290/44 |
| 2014/0152013 | A1 * | 6/2014 | Spruce .................. | F03D 7/0204 290/44 |
| 2014/0321975 | A1 | 10/2014 | Wieser | |
| 2016/0032892 | A1 | 2/2016 | Herrig et al. | |
| 2017/0002794 | A1 * | 1/2017 | Williams ............... | F03D 7/0204 |
| 2017/0248122 | A1 * | 8/2017 | Williams ............... | F03D 1/0675 |
| 2020/0049126 | A1 * | 2/2020 | Tsuda .................... | F03D 7/0204 |

FOREIGN PATENT DOCUMENTS

| | | |
|---|---|---|
| CN | 202176458 | 3/2012 |
| CN | 104806459 A | 7/2015 |
| DE | 102015112597 A1 | 2/2016 |
| EP | 1 790 852 | 5/2007 |
| JP | 57-180163 | 11/1982 |
| JP | 58-56174 | 4/1983 |
| JP | 2002-285948 | 10/2002 |
| JP | 2003-28043 | 1/2003 |
| JP | 2003-97416 | 4/2003 |
| JP | 2007-64062 | 3/2007 |
| JP | 2007-309287 | 11/2007 |
| JP | 2007-327371 | 12/2007 |
| JP | 2011-102587 | 5/2011 |
| JP | 2013-532256 | 8/2013 |
| WO | 2005/040604 A2 | 5/2005 |
| WO | 2013/071328 A1 | 5/2013 |

OTHER PUBLICATIONS

Official Communication issued in Japanese Patent Application No. 2017-088557 dated Jun. 16, 2020 (with English translation).
Chinese Office Action, Chinese Patent Office, Application No. 201880027750.4, dated Jul. 14, 2020, English translation.

* cited by examiner

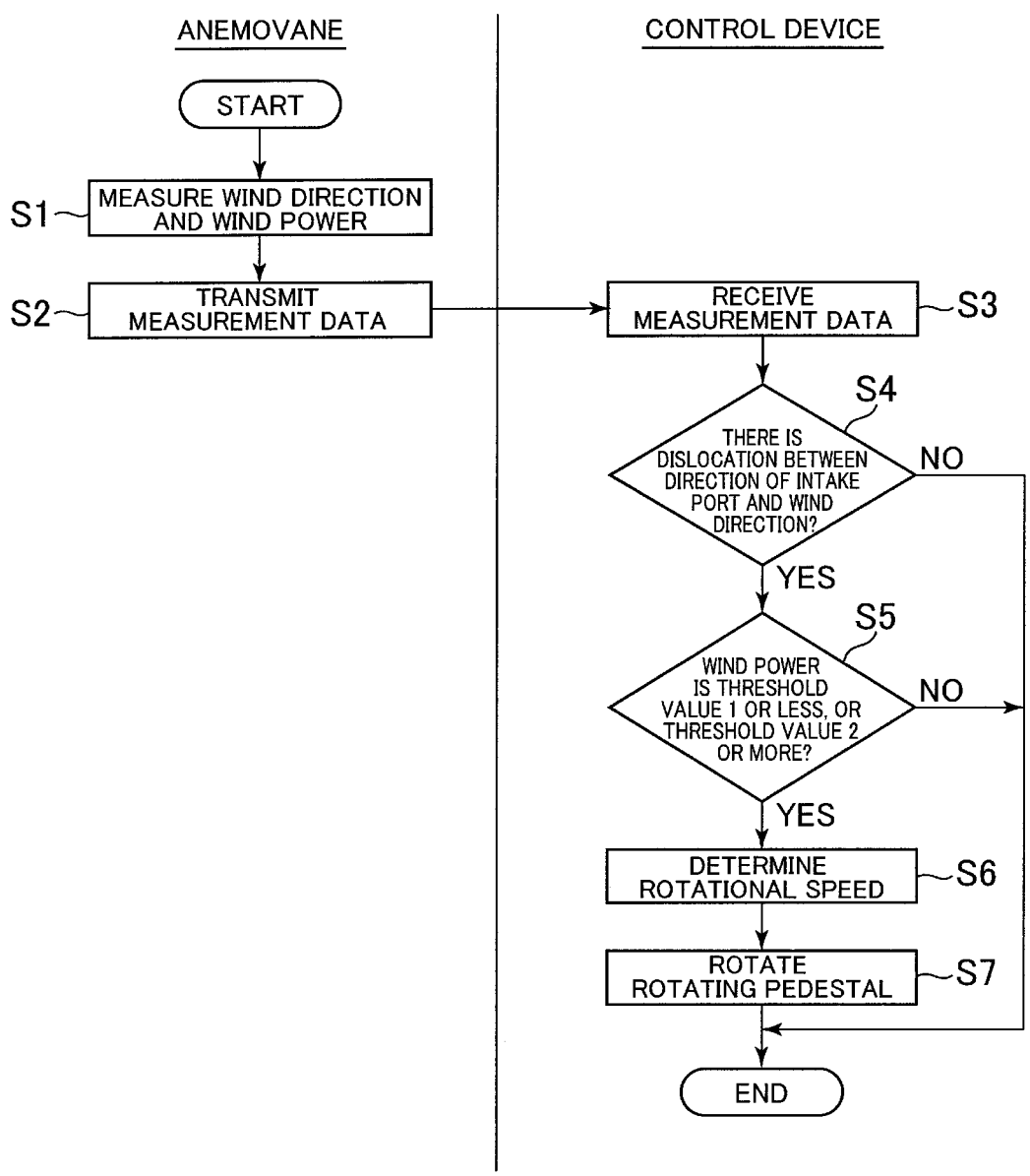

WIND POWER GENERATION SYSTEM INCLUDING A ROTATING PEDESTAL AND A WIND POWER GENERATION APPARATUS WITH A DUCT

TECHNICAL FIELD

The present invention relates to a wind power generation system.

BACKGROUND ART

Recently, from consideration for global environment, concern about power generation apparatuses utilizing clean energy has been growing. As one of such power generation apparatuses, a wind power generation apparatus is proposed. The wind power generation apparatus is an apparatus that rotates an impeller by wind power, and converts rotational energy obtained by the rotation of the impeller into electric energy.

It is said that a power generation amount of the wind power generation apparatus is proportional to the cube of wind velocity, and in order to improve the power generation amount and power generating efficiency, various studies are performed. For example, Patent Literature 1 discloses that a cross section of a duct provided around an impeller is formed in a streamline shape from a front end to a rear end of the duct, so that the velocity of wind flowing into the duct from a front surface side of the duct is increased, and an power generation amount is improved.

For example, Patent Literature 2 discloses that a position of an impeller in a duct having a streamline shaped cross section is devised, Patent Literature 3 discloses that a ratio between each of the opening diameter (intake port diameter) of a front end of a duct and the opening diameter (exhaust port diameter) of a rear end, and the inner diameter of the duct is devised. For example, Patent Literature 4 discloses an aggregate of wind power generation apparatuses including a plurality of wind power generation apparatuses, such ones as disclosed in Patent Literature 1. According to Patent Literature 4, a support that supports the aggregate is provided through a bearing so as to be rotatable to the earth's surface, and the support is rotated by wind power received by an outer peripheral surface of the duct, so that the wind power generation apparatuses turn in the direction from which wind blows.

CITATION LIST

Patent Literature

Patent Literature 1: JP 2003-028043 A
Patent Literature 2: JP 2007-309287 A
Patent Literature 3: JP 2007-327371 A
Patent Literature 4: JP 2003-097416 A

SUMMARY OF INVENTION

Technical Problem

However, wind power generation apparatuses disclosed in Patent Literatures 1 to 3 have a problem in that as long as wind does not enter from just a front side of an intake port, air turbulence is generated in the duct by wind which collides with an inner wall of the duct, and a wind velocity increasing effect cannot be obtained as expected. Particularly, in a case in which wind blows from just a lateral side of the duct, wind that enters the duct is weak, and therefore there is a problem in that the power generation amount or power generating efficiency is greatly lowered.

The aggregate of the wind power generation apparatuses disclosed in Patent Literature 4 is designed such that the intake ports of the wind power generation apparatuses can be turned in the direction from which wind blows. This is only for changing the direction of the intake ports by utilizing wind power received by the outer peripheral surface of the duct, the direction of the intake ports cannot be controlled with high precision, and a certain amount of dislocation is generated between the direction from which wind blows, and the direction of the intake port of each wind power generation apparatus. As a result, similarly to Patent Literatures 1 to 3, air turbulence is generated in the duct by wind which collides with the inner wall of the duct, and a wind velocity increasing effect cannot be obtained as expected. Recently, clean energy attracts attention, and appearance of a wind power generation apparatus having a further improved power generation amount and power generating efficiency has been desired.

The present invention has been made in view of the aforementioned problems. Accordingly, an object of the present invention is to provide a wind power generation system including a wind power generation apparatus having an impeller in a duct, the wind power generation system being capable of reducing generation of air turbulence in the duct, sufficiently increasing the velocity of wind in the duct, and improving a power generation amount and power generating efficiency.

Solution to Problem

The above objects can be achieved by a wind power generation system described below.

[1] A wind power generation system comprising: a wind power generation apparatus that includes at least a duct having a longitudinal cross section formed in a substantial streamline shape, the longitudinal cross section being cut along a central axis, an impeller placed in the duct, and a power generator that generates power by rotation of the impeller; an anemovane installed so as to be able to measure a wind direction and/or wind power in a vicinity of the wind power generation apparatus; a rotating pedestal that supports the wind power generation apparatus so as to be rotatable along a supporting surface; and a control device that controls a rotational angle of the rotating pedestal based on the wind direction and/or the wind power measured by the anemovane.

[2] The wind power generation system according to above [1], wherein the control device further controls rotational speed of the rotating pedestal based on the wind power measured by the anemovane.

[3] The wind power generation system according to above [1] or [2], wherein at least a portion of an inner wall of the duct expands toward the central axis of the duct to form a minimum inner diameter part at which an inner diameter of the duct is minimum between an intake port and an exhaust port of the duct.

[4] The wind power generation system according to above [3], wherein the impeller is placed between the minimum inner diameter part and the exhaust port of the duct, and a distance from the minimum inner diameter part to the impeller is in a range of 19.8 to 29.0% of a distance from the minimum inner diameter part to the exhaust port.

[5] The wind power generation system according to any one of above [1] to [4], wherein a support for supporting the impeller and the power generator is erected from the inner wall of the duct toward a center of gravity of the duct or a vicinity of the center of gravity.

[6] The wind power generation system according to any one of above [1] to [5], wherein the impeller has four blades.

Advantageous Effects of Invention

According to the wind power generation system according to the present invention, the rotational angle of the rotating pedestal that supports the wind power generation apparatus so as to be rotatable is controlled based on the wind direction and/or the wind power measured by the anemovane, so that it is possible to reduce generation of air turbulence in the duct of the wind power generation apparatus, sufficiently increase the velocity of wind in the duct, and improve a power generation amount and power generating efficiency.

BRIEF DESCRIPTION OF THE DRAWINGS

FIG. 6 is a flowchart illustrating an example of a control process of the rotating pedestal according to an embodiment of the present invention.

DESCRIPTION OF EMBODIMENTS

Hereinafter, embodiments of the present invention will be described with reference to the drawings, but the present invention is not limited to the drawings and the embodiments. The present invention is not limited to the following preferable numerical values and configurations.

In this specification, a "substantial streamline shape" means such a shape that a shape of an inner peripheral side edge in a longitudinal cross section of a wall body of a duct is deformed within a range of the purpose of increasing the velocity of wind which flows into the duct from an intake port side of the duct without causing turbulence inside the duct. Additionally, the "substantial streamline shape" includes such a shape that a shape of an outer peripheral side edge in the longitudinal cross section of the wall body of the duct is deformed within a range of the purpose of preventing generation of a swirl on an outer peripheral surface. An example of such a deformation includes a case in which the shape of a portion of the outer peripheral side edge which reaches a rear end from a front end of the duct in the longitudinal cross section of the wall body of the duct is formed in the streamline shape. Additionally, the "substantial streamline shape" includes such a shape that the shape of the outer peripheral side edge in the longitudinal cross section of the wall body of the duct is linear.

[Wind Power Generation Apparatus]

Figure 1:
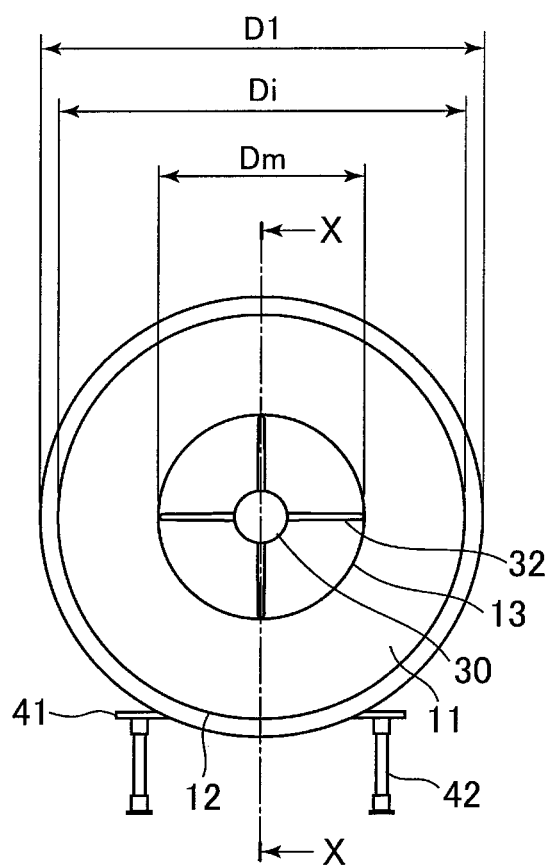
FIG. 1 is a front view illustrating an example of a configuration of a wind power generation apparatus according to an embodiment of the present invention.
Figure 2:
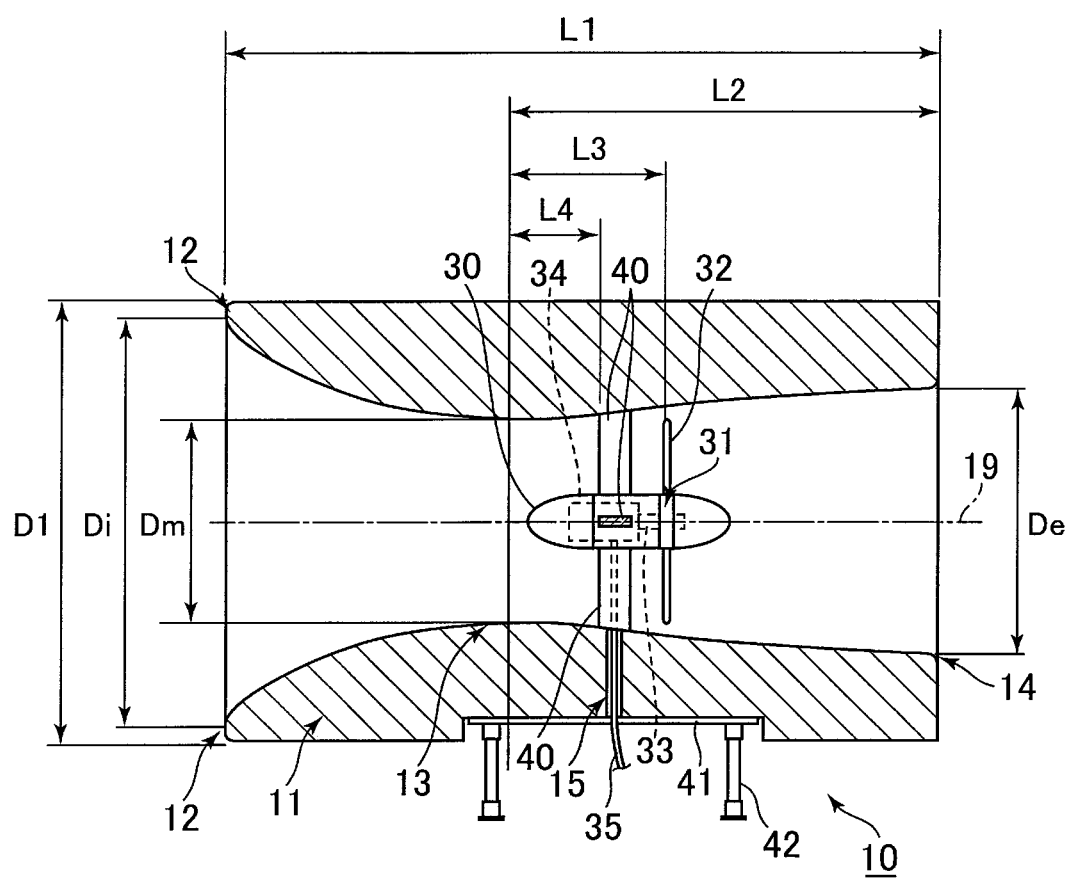
FIG. 2 is a partial sectional view illustrating an example of the configuration of the wind power generation apparatus in a case in which a duct 11 is cut along a line X-X illustrated in FIG. 1.

Hereinafter, a wind power generation apparatus will be described. FIG. 1 is a front view illustrating an example of a configuration of a wind power generation apparatus according to an embodiment of the present invention. FIG. 2 is a partial sectional view illustrating an example of the configuration of the wind power generation apparatus in a case in which a duct 11 is cut along a line X-X illustrated in FIG. 1. The wind power generation apparatus 10 illustrated in FIG. 1 and FIG. 2 includes at least the cylindrical duct 11, a cylindrical container 30, a current collection cable 35, a support 40, a support plate 41, and four leg parts 42.

The duct 11 includes at least a front end 12 forming an intake port, a minimum inner diameter part 13 at which the inner diameter of the duct 11 is minimum, a rear end 14 forming an exhaust port, and a cable hole 15 for allowing a current collection cable 35 connected to a power generator 34 to pass through. The duct 11 includes an outer diameter D1 of the intake port side of the duct 11. The inner diameter of the duct 11 gradually reduces its length from the front end 11 to the minimum inner diameter part 13, and gradually increases from the minimum inner diameter part 13 to the rear end 14. In other words, one portion of an inner wall body of the duct 11 expands toward a central axis 19 of the duct, and the minimum inner diameter part at which the inner diameter of the duct is minimum is formed between the intake port and the exhaust port. Thus, the duct 11 is configured such that a shape of a longitudinal cross section cut by the line X-X along the central axis 19 is formed in a substantial streamline shape, so that it is possible to increase the velocity of wind that flows into the duct from the intake port of the duct 11, and it is possible to improve a power generation amount and power generating efficiency.

A ratio of the length of the intake port diameter Di of the duct 11 to the length of the inner diameter Dm of the minimum inner diameter part of the duct 11 (Di/Dm) is, for example, preferably in a range of 1.4 to 2.6, more preferably in a range of 1.8 to 2.3, and much more preferably in a range of 1.9 to 2.1. When a value of Di/Dm is less than 1.4, there is a possibility that the velocity of the wind that flows into the duct 11 is not sufficiently increased in a region from the front end 12 to the minimum inner diameter part 13. On the other hand, when the value of Di/Dm exceeds 2.6, resistance to wind in the front end 12 and in the vicinity of the front end 12 is increased, and therefore one portion of wind that blows toward the intake port flows outside the duct 11, and the quantity of wind that flows in the duct 11 is reduced. As a result, there is a possibility that power generating efficiency is lowered.

A ratio of the length of the exhaust port diameter De of the duct 11 to the length of the inner diameter Dm of the minimum inner diameter part of the duct 11 (De/Dm) is, for example, preferably in a range of 1.1 to 1.6, more preferably in a range of 1.2 to 1.5, and much more preferably in a range of 1.3 to 1.4. When a value of De/Dm is less than 1.1, atmospheric pressure on the rear side of the minimum inner diameter part 13 tends to increase, and the quantity of wind that flows into the duct 11 from the intake port tends to reduce. On the other hand, when the value of De/Dm exceeds 1.6, wind that flows from the minimum inner diameter part 13 to the rear end 14 peels from an inner peripheral side surface of the duct 11, so that turbulence tends to be likely to occur in a flow of wind. As a result, there is a possibility of causing a problem in that the velocity of wind in the vicinity of the impeller 31 is reduced, the power generation amount or the power generating efficiency is lowered, or output power becomes unstable, for example.

When turbulence of the flow of wind that passes through the impeller is caused by a slipstream that is generated behind the duct 11, the cylindrical container 30, or the support 40, or a Karman vortex caused by peeling of wind from a duct inner surface, a cylindrical container surface, or a support surface, a velocity component of the direction other than a velocity component of the travelling direction is generated in the wind, and the flow of the wind sometimes becomes slow behind the impeller in the duct. In a case in which such wind turbulence occurs, even when the cross section shape of the duct is formed in the substantial streamline shape, the velocity of wind that flows into the duct 11 from the intake port cannot be sufficiently increased, and there is a possibility that higher power generating efficiency is not obtained as expected. Accordingly, influence on the power generating efficiency by such wind turbulence is preferably reduced as much as possible.

From a viewpoint of reduction of the influence on the power generating efficiency by the turbulence of the wind that is generated in the duct 11, the length L1 in the central axis direction of the duct 11 is, for example, preferably 1.3 to 3.0 times of the intake port diameter Di of the intake port formed by the front end 12, more preferably 2.5 to 3.0 times, and much more preferably 2.8 to 3.0 times. With such a configuration, a position at which turbulence behind the impeller occurs is shifted to a sufficient rear side with respect to a position at which the impeller is installed, and influence on a wind velocity increasing effect in the vicinity of the impeller can be reduced. Accordingly, the velocity of the wind that flows into the duct 11 from the intake port can be sufficiently increased until the wind reaches the impeller, and therefore it is possible to suppress lowering of the power generating efficiency.

Similarly, from the viewpoint of reduction of the influence on the power generating efficiency by the turbulence of the wind that is generated in the duct 11, the duct 11 is preferably configured such that both the outer peripheral side edge and the inner peripheral side edge of the duct 11 do not intersect with a straight line connecting the front end 12 and the rear end 14 in the longitudinal cross section of the duct 11. When swirl is generated on an outer peripheral surface of the duct 11, the generated swirl sometimes moves behind the duct 11 (behind the impeller). Accordingly, in order to prevent the generation of the swirl on the outer peripheral surface, the shape of the outer peripheral side edge in the longitudinal cross section of the duct 11 is, much more preferably, formed in the substantial streamline shape.

The cylindrical container 30 includes at least the impeller 31, a rotating shaft 33, and the power generator 34. The cylindrical container 30 is preferably formed in a conical shape or a conical shape having an expanded side surface (so-called cone shape). With such a configuration, it is possible to enhance the wind velocity increasing effect of wind by not only the inner wall of the duct 11 but also the cylindrical container. As a result, it is possible to enhance the power generation amount and the power generating efficiency.

The impeller 31 is provided on a rear side of the cylindrical container 30, includes blades 32, and is connected to the rotating shaft 33. The rotating shaft 33 is provided in the cylindrical container 30 along the central axis 19 of the duct 11, and is connected to the impeller 31 and the power generator 34. The power generator 34 is provided in the cylindrical container 30, and is connected to the rotating shaft 33 and the current collection cable 35. The blades 32 receive power of wind, so that the impeller 31 rotates, the rotational energy is transmitted to the power generator 34 through the rotating shaft 33, and is converted into electric energy in the power generator 34. Electric energy obtained by the power generator 34 is transmitted to a power source apparatus, and an external current collector of a rotating pedestal 50 described below through the current collection cable 35.

The impeller 31 (blades 32) is preferably placed between the minimum inner diameter part 13 and the exhaust port. A distance L3 from the minimum inner diameter part 13 to the impeller 31 is preferably in a range of 19.8 to 29.0% of a distance L2 from the minimum inner diameter part 13 to the exhaust port, more preferably in a range of 21 to 25%, and much more preferably in a range of 22 to 23%. The wind that flows into the duct 11 has a point at which the wind velocity is maximized between the minimum inner diameter part 13 and the exhaust port. Accordingly, the impeller 31 is placed between the minimum inner diameter part 13 and the exhaust port, particularly, the impeller 31 is placed such that the distance from the minimum inner diameter part 13 to the impeller 31 is in a range of 19.8 to 29.0% of the distance from the minimum inner diameter part 13 to the exhaust port, so that wind whose wind velocity is increased up to a maximum or a state near to the maximum can be given to the blades 32. As a result, the power generation amount and the power generating efficiency tend to be able to be improved.

The number of the blades 32 to be provided in the impeller 31 is not particularly limited, but is preferably, for example, 4 to 5. When the number of the blades 32 is 3 or less, quantity of wind received by the blades 32 is small, and power generating efficiency is lowered. When the number of the blades 32 exceeds 5 or more, swirls generated from the blades 32 are increased, and the power generating efficiency is lowered, and noise caused by rotation of the blades 32 becomes loud. Additionally, the number of the blades 32 is particularly preferably 4. In a case in which the number of the blades 32 is 4, a wind power generation apparatus, noise of which is not too loud, and power generating efficiency of which is high, can be obtained. Additionally, in a case in which the number of the blades 32 is 4, it is possible to facilitate balance adjustment of the blades 32 at the time of manufacturing, and control manufacturing cost compared to a case in which the number of the blades 32 is five.

The support 40 is erected on the inner wall of the duct 11 so as to support the cylindrical container 30. In this embodiment, the four supports 40 are provided, and the current collection cable 35 from the power generator 34 toward the cable hole 15 is buried in one of the supports. The support 40 is preferably erected from the inner wall of the duct 11 toward the center of gravity of the duct 11 or the vicinity of the center of gravity of the duct. With such a configuration, it is possible to smoothly and promptly perform rotating operation by the rotating pedestal 50 described below.

A distance L4 from the minimum inner diameter part 13 to the supports 40 is preferably 10% or more of the length of the distance L2 from the minimum inner diameter part 13 of the duct to the rear end 14, more preferably 20% or more of the length of the distance L2, and much more preferably 23% or more of the length of the distance L2. With such a configuration, the support 40, which is likely to prevent increase of the velocity of wind that flows into the duct 11, is placed at a position apart from the minimum inner diameter part 13, and therefore it is possible to sufficiently enhance the wind velocity increasing effect of wind in a region between the intake port of the duct 11 and the minimum inner diameter part 13.

The support plate 41 is a plate for supporting the duct 11, and the shape and the material of the support plate is not limited as long as the support plate can support the duct 11. The leg parts 42 are provided downward from the support plate 41, and are fixed to fixing parts 52 of the rotating pedestal 50 described below.

Figure 3:
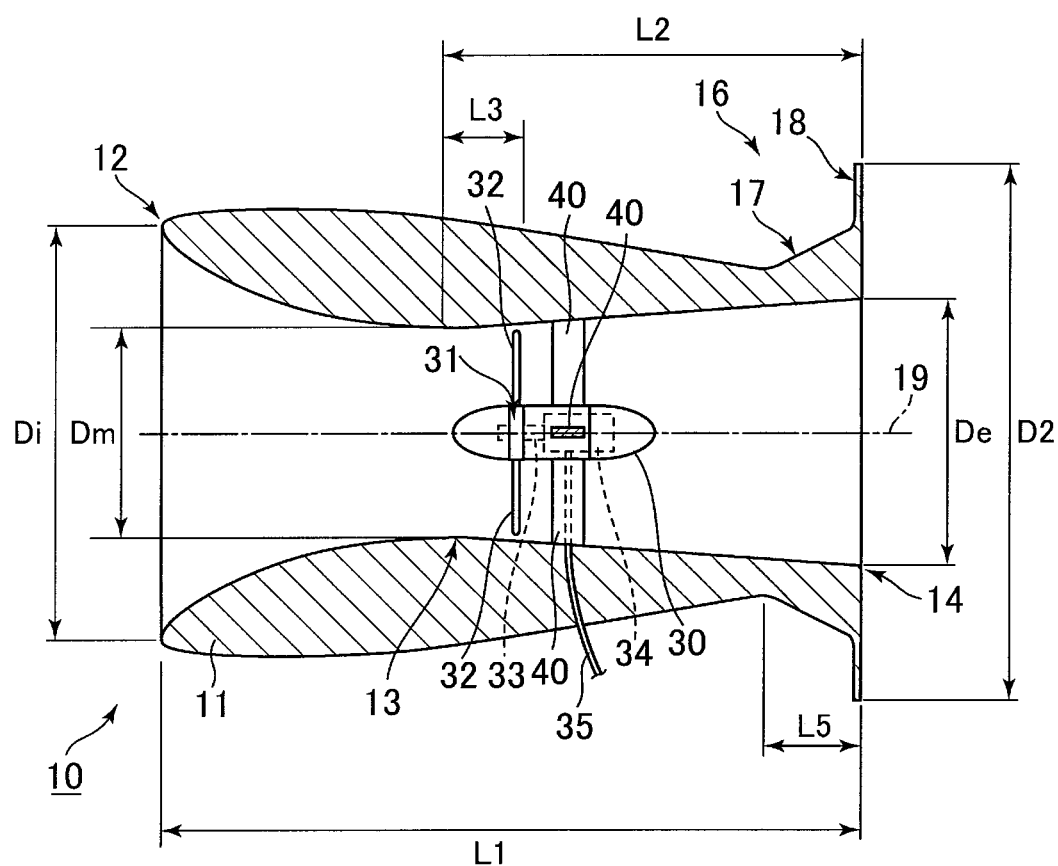
FIG. 3 is a partial sectional view illustrating an example of a configuration of a wind power generation apparatus according to an embodiment of the present invention.

FIG. 3 is a partial sectional view illustrating an example of a configuration of a wind power generation apparatus according to an embodiment of the present invention. The wind power generation apparatus illustrated in FIG. 3 is a modification of the wind power generation apparatus illustrated in the above FIG. 1 and FIG. 2, and the description about the portions denoted by reference numerals identical to those of the wind power generation apparatus of FIG. 1 and FIG. 2 will be appropriately omitted. The contents described as description of the wind power generation apparatus of FIG. 1 and FIG. 2 can adopt to the wind power generation apparatus of FIG. 3 in a range in which inconsistency is not caused. The following description related to the wind power generation apparatus of FIG. 3 can also adopt to the wind power generation apparatus of FIG. 1 and FIG. 2 in a range in which inconsistency is not caused.

The outer peripheral side edge of the duct 11 has such a shape as to gradually approach the central axis 19 after gradually separating from the central axis 19, from the intake port side to the exhaust port side, in the longitudinal cross section of the duct 11. In other words, the outer peripheral side edge of the duct 11 has the substantial streamline shape. With such a configuration, it is possible to sufficiently suppress generation of a swirl on the outer peripheral surface. As a result, it is possible to suppress lowering of the wind velocity increasing effect of the wind in the duct 11.

The outer peripheral side edge of the duct 11 includes a wind direction adjuster 16 on a rear side (exhaust port side) thereof. The wind direction adjuster 16 includes a skirt part 17 integrally formed with the duct 11, and composed of an inclined plane formed so as to separate from the central axis 19 toward the rear side of the duct, an edge 18 connected to the skirt part 17, and having a surface formed so as to separate from the central axis 19, and substantially perpendicular to the central axis 19.

The wind direction adjuster 16 gradually adjusts the direction of wind that travels toward the rear side along an outer surface of the duct 11, to the direction toward the radially outside of the duct 11 by the skirt part 17, and then drastically adjusts the direction of the wind toward the radially outside of the duct 11 by the edge 18. With such a configuration, a space region (hereinafter also referred to as a "decompression region") in which the atmospheric pressure is low can be formed behind the edge 18. As a result, larger quantity of wind is further allowed to flow from the intake port of the duct 11, and it is possible to enhance the wind velocity increasing effect.

The length L5 along the central axis 19 direction in the wind direction adjuster 16 is preferably in a range of 5 to 25% of the length L1 in the central axis 19 direction of the duct 11, more preferably in a range of 5 to 20%, and much more preferably in a range of 5 to 18%. In a case in which the length L5 is less than 5% of the length L1, there is a possibility that the decompression region cannot be sufficiently generated. On the other hand, in a case in which the length L5 exceeds 25% of the length L1, the size of the wind direction adjuster 16 becomes too large. As a result, handling of the wind power generation apparatus 10 tends to become difficult.

A ratio of the length of the maximum outer diameter D2 of the exhaust port side of the duct 11 to the length of the intake port diameter Di of the duct 11 (D2/Di) is preferably, for example, in a range of 110% to 140%, more preferably in a range of 115% to 135%, and much more preferably in a range of 120% to 130%. When a value of D2/Di is less than 110%, there is a possibility that the decompression region cannot be sufficiently generated. On the other hand, in a case in which the value of D2/Di exceeds 140%, the size of the wind direction adjuster 16 becomes too large compared to the size of the exhaust port. As a result, handling of the wind power generation apparatus 10 tends to become difficult.

The impeller 31 is provided so as to be located on the intake port side with respect to the support 40. With such a configuration, turbulence of the flow of wind generated by the support 40 can be generated at a position sufficiently apart from the impeller 31, and therefore it is possible to suppress lowering of the wind velocity increasing effect in the vicinity of the impeller 31.

[Rotating Pedestal]

Hereinafter, the rotating pedestal will be described. The rotating pedestal is a part that supports the wind power generation apparatus aforementioned so as to be rotatable. The rotating pedestal has a function of controlling its own rotational angle such that the direction of the intake port of the wind power generation apparatus is directed in the direction from which wind blows, based on the wind direction and/or wind power measured by an anemovane.

Figure 4:
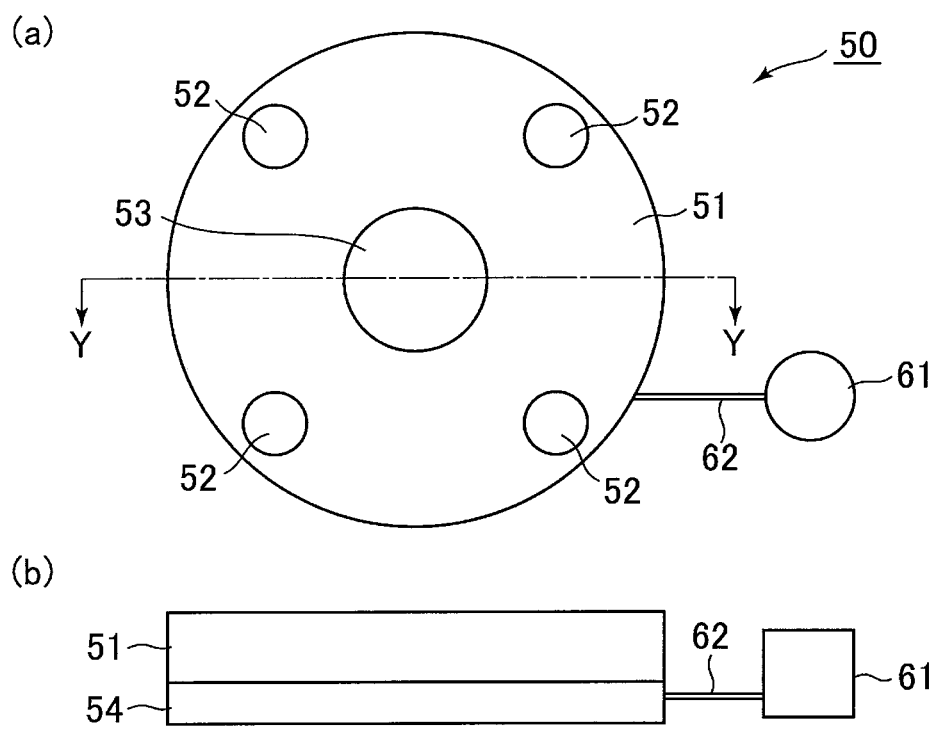
FIG. 4 are schematic views illustrating an example of a configuration of the rotating pedestal according to an embodiment of the present invention.
Figure 5:
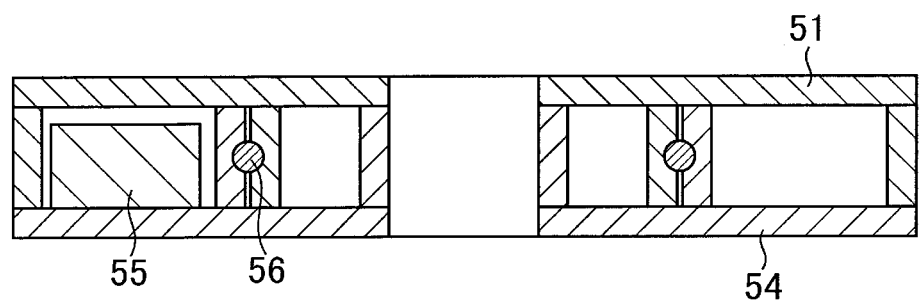
FIG. 5 is a sectional view of the rotating pedestal in a case in which the rotating pedestal is cut along a line Y-Y illustrated in FIG. 4.

FIG. 4 are schematic views illustrating an example of a configuration of the rotating pedestal according to an embodiment of the present invention. FIG. 4(a) is a top view illustrating an example of a configuration of the rotating pedestal according to an embodiment of the present invention, and FIG. 4(b) is a front view of the rotating pedestal illustrated in FIG. (a). FIG. 5 is a sectional view of the rotating pedestal 50 in a case in which the rotating pedestal 50 is cut along a line Y-Y illustrated in FIG. 4(a).

The rotating pedestal 50 having a substantially columnar shape illustrated in FIG. 4 and FIG. 5 includes at least a rotating part 51 including the four fixing parts 52 on an upper surface thereof, a base part 54 that supports the rotating part 51, a control device 55 that controls rotation of the rotating pedestal 50, and a ball bearing 56 provided between the rotating part 51 and the base part 54 such that the rotating part 51 is rotatable. A cable hole 53 is provided at a central position on the top view of the rotating pedestal 50 so as to penetrate the rotating part 51 and the base part 54. The control device 55 is connected to an anemovane 61 installed so as to be able to measure the wind direction and the wind power (wind velocity) in the vicinity of the wind power generation apparatus 10 through a cable 62. The control device 55 and the anemovane 61 may be configured to be connected by radio without providing the cable 62.

As long as the rotating pedestal 50 can rotatably support the wind power generation apparatus 10, and has a function of controlling its own rotational angle such that the direction of the intake port of the wind power generation apparatus 10 is directed in the direction from which wind blows, based on the wind direction and/or the wind power measured by the anemovane 61, the shape, the material, the configuration, and the like of the rotating pedestal 50 are not particularly limited.

The fixing parts 52 are provided to fix the leg parts 42 of the wind power generation apparatus 10. The cable hole 53 is provided to allow the current collection cable 35 extending from the wind power generation apparatus 10 to pass through. The ball bearing 56 is provided in order to suppress abrasion or heat generation caused between the rotating part 51 and the base part 54 by rotation of the rotating part 51.

In place of the ball bearing 56, a known bearing such as a roller bearing, a taper roller bearing, and a needle bearing may be used.

The control device 55 is provided in the rotating pedestal 50. However, as long as the control device can rotate the rotating part 51, an installation position of the control device is not limited. The control device 55 includes at least a rotational angle detection sensor, an origin position detection sensor, a control circuit, a motor for rotation, a power supply circuit, and a battery.

The rotational angle detection sensor has a function of detecting the rotational angle of the rotating part 51, and inputting the detected rotational angle as an output signal to the control circuit. The detection of the rotational angle by the rotational angle detection sensor is preferably performed, for example, with precision of ±3 degrees, more preferably performed with precision of ±2 degrees, and much more preferably performed with precision of ±1 degree. The origin position detection sensor has a function of setting an origin position (direction based on the rotating part 51) of the rotating part 51, and detecting that the rotating part 51 passes through the origin position. The control circuit calculates the direction in which the rotating part 51 (intake port of the wind power generation apparatus 10) is currently directed, by the rotational angle detected by the rotational angle detection sensor, and the origin position set by the origin position detection sensor.

The control circuit controls the rotational angle of the rotating part 51 based on the information related to the wind direction and/or the wind power measured by the anemovane 61. The control circuit preferably controls the rotational speed of the rotating part 51 based on the information related to the wind direction and/or the wind power measured by the anemovane 61. A control process by the control circuit will be described in detail in description of FIG. 6.

The motor for rotation has a function of rotating the rotating part 51 based on an output signal from the control circuit. The power supply circuit and the battery each have a function of supplying power for driving the control device 55. The power supply circuit and the battery are preferably configured so that the power supply circuit and the battery can store electric power generated by the wind power generation apparatus 10 through the current collection cable 35.

As long as the anemovane 61 can measure the wind direction and/or the wind power (wind velocity), and transmit information related to the measured wind direction and/or wind power (wind velocity) to the control device 55 through a cable or by radio, the anemovane 61 is not particularly limited, and a conventionally known anemovane can be appropriately used. The anemovane 61 preferably can measure both the wind direction and the wind power, and transmit the information related to both the measured wind direction and wind power to the control device 55 through a cable or by radio. As long as a position at which the anemovane 61 is installed is a position at which the wind direction and/or the wind power in the vicinity of the wind power generation apparatus 10 can be measured, the position is not particularly limited. Here, the vicinity of the wind power generation apparatus 10 is preferably, for example, a position within a radius of 3 m from the intake port of the wind power generation apparatus 10, and more preferably a position within a radius of 2 m.

The wind power generation system of the present invention may be the aggregate of the wind power generation system composed of a plurality of the wind power generation apparatuses 10 and a plurality of the rotating pedestals 50 supporting these wind power generation apparatuses 10 so as to be rotatable. In the aggregate, the anemovane 61 may be installed one by one in the vicinity of the plurality of wind power generation apparatus 10, or may be installed in the vicinity of any one of the wind power generation apparatuses 10, and directly or indirectly transmit the information related to the measured wind direction and/or wind power (wind velocity) from the single anemovane 61 to each control device 55 of the plurality of the rotating pedestal 50. Here, indirect transmission of information means transmission of information to the other control device 55 through any one or more of the control devices 55, for example.

FIG. 6 is a flowchart illustrating an example of a control process of the rotating pedestal according to an embodiment of the present invention. The sequence of processes composing the flowchart described below is in random order in such a range that a contradiction or an inconsistency is not caused in process contents.

First, the anemovane 61 measures the wind direction and the wind power in the vicinity of the wind power generation apparatus 10 (Step S1). Then the anemovane transmits measurement data related to the measured wind direction and wind power to the control device 55 of the rotating pedestal 50 (Step S2).

The control device 55 then receives the measurement data related to the wind direction and the wind power measured by the anemovane (Step S3). Next, the control device then controls the rotational angle and the rotational speed of the rotating part 51 based on the measurement data received in Step S3. Specifically, first, it is determined whether or not there is dislocation between the direction of the rotating part 51 equivalent to the direction of the intake port of the wind power generation apparatus 10 (hereinafter also referred to as the "direction of the intake port"), and the wind direction indicated by the measurement data (Step S4). In a case in which there is no dislocation between the direction of the intake port, and the wind direction indicated by the measurement data (NO in Step S4), the rotating pedestal does not need to be rotated, and therefore the process is terminated. The case in which there is no dislocation between the direction of the intake port, and the wind direction indicated by the measurement data means a case in which dislocation between the direction of the intake port of the wind power generation apparatus 10, and the direction from which wind blows is, for example, within ±3 degrees.

In a case in which there is dislocation between the direction of the intake port, and the wind direction indicated by the measurement data (YES in Step S4), it is determined whether the wind power indicated by the measurement data is a threshold value 1 or less, or a threshold value 2 or more (Step S5).

Here, the threshold value 1 is, for example, a value that gives an excessive burden on the wind power generation apparatus 10 due to too much wind power, or a value that is not suitable for rotation of the rotating part 51 due to too much wind power. The threshold value 1 can be appropriately set by the weight, the durability, and the like of the wind power generation apparatus 10, and preferably is, for example, wind velocity of 30 m/s, and more preferably is wind velocity of 20 m/s.

The threshold value 2 is, for example, a value that indicates such wind power as to destroy the wind power generation apparatus 10. The threshold value 2 can be appropriately set by the weight, the durability, and the like of the wind power generation apparatus 10, and preferably is, for example, wind velocity of 40 m/s, and more preferably is wind velocity of 60 m/s.

In a case in which the wind power indicated by the measurement data is larger than the threshold value 1 and less than the threshold value 2 (NO in Step S5), the rotating part 51 is not rotated, and the process is terminated. In this case, until the wind power becomes wind power (for example, the threshold value 1 or less) suitable for rotation of the rotating part 51, or, such wind power (for example, the threshold value 2 or more) as to destroy the wind power generation apparatus 10, the direction of the intake port is maintained to be the present direction.

In a case in which the wind power indicated by the measurement data is the threshold value 1 or less (YES in Step S5), the rotational speed of the rotating part 51 is determined based on the wind power indicated by the measurement data. For example, the weaker the wind power is, the faster the rotational speed preferably becomes. In a case in which the wind power is weak, the direction of the intake port is directed in the direction from which the wind blows, and the power generating efficiency is more promptly improved. In a case in which the wind power is strong, the rotational speed is preferably made slow in order to reduce burdens on the wind power generation apparatus 10 and the rotating pedestal by wind, and reduce the rate of occurrence of failure.

In a case in which the wind power indicated by the measurement data is the threshold value 2 or more (YES in Step S5), the direction of the intake port tries to be directed in the direction from which the wind blows in order to prevent the wind power generation apparatus 10 from being destroyed by very strong lateral wind received by the wind power generation apparatus 10. The rotational speed at this time is preferably slow compared to a case in which the wind power is the threshold value 1 or less.

Next, the control device 55 rotates the rotating part 51 at the rotational speed determined in Step S6 such that the direction of the intake port is directed in the direction from which wind blows, and terminates the process.

REFERENCE SIGNS LIST

10 WIND POWER GENERATION APPARATUS
11 DUCT
12 FRONT END (INTAKE PORT)
13 MINIMUM INNER DIAMETER PART
14 REAR END (EXHAUST PORT)
15 CABLE HOLE
16 WIND DIRECTION ADJUSTER
17 SKIRT PART
18 EDGE
19 CENTRAL AXIS
30 CYLINDRICAL CONTAINER
31 IMPELLER
32 BLADE
33 ROTATING SHAFT
34 POWER GENERATOR
35 CURRENT COLLECTION CABLE
40 SUPPORT
41 SUPPORT PLATE
42 LEG PART
50 ROTATING PEDESTAL
51 ROTATING PART
52 FIXING PART
53 CABLE HOLE
54 BASE PART
55 CONTROL DEVICE
56 BALL BEARING
61 ANEMOVANE
62 CABLE

What is claimed is:

1. A wind power generation system comprising:
   a wind power generation apparatus that includes at least:
      a duct having a longitudinal cross section formed in a substantial streamline shape, the longitudinal cross section being taken along a central axis of the duct,
      an impeller placed in the duct, and
      a power generator that generates power by rotation of the impeller;
   an anemovane installed and configured to measure a wind direction and a wind velocity in a vicinity of the wind power generation apparatus;
   a rotating pedestal that supports the wind power generation apparatus so as to be rotatable along a supporting surface; and
   a control device that controls a rotational angle of the rotating pedestal based on the wind direction and/or the wind velocity measured by the anemovane, wherein
   the control device controls the rotating pedestal to not rotate when the control device determines that the wind velocity measured by the anemovane is between a first threshold value indicating a first value of excessive wind velocity and a second threshold value indicating a second value of excessive wind velocity that is higher than the first value of excessive velocity,
   the first value of excessive wind velocity indicates a wind velocity that gives an excessive burden on the wind power generation apparatus,
   the second value of excessive wind velocity indicates a wind velocity sufficient to destroy the wind power generation apparatus, and
   when the control device determines that the wind velocity measured by the anemovane is equal to or less than the first threshold value, the control device further controls a rotational speed of the rotating pedestal to increase when the wind velocity measured decreases and controls the rotational speed of the rotating pedestal to decrease when the wind velocity measured increases.

2. The wind power generation system according to claim 1, wherein
   at least a portion of an inner wall of the duct narrows in diameter toward the central axis of the duct so that the duct includes a minimum inner diameter part at which an inner diameter of the duct is minimum, and the minimum inner diameter part is disposed between an intake port of the duct and an exhaust port of the duct.

3. The wind power generation system according to claim 1, wherein
   the impeller is placed between the minimum inner diameter part and the exhaust port of the duct, and
   a distance from the minimum inner diameter part to the impeller is in a range of 19.8 to 29.0% of a distance from the minimum inner diameter part to the exhaust port.

4. The wind power generation system according to claim 1, wherein
   a support for supporting the impeller and the power generator is erected from an inner wall of the duct toward a center of gravity of the duct or a vicinity of the center of gravity.

5. The wind power generation system according to claim 1, wherein
   the impeller has four blades.

6. The wind power generation system according to claim 1, wherein when the control device determines that the wind velocity measured by the anemovane is equal to or greater than the second threshold value, the control device further controls the rotational speed of the rotating pedestal to be slower than the rotational speed of the rotating pedestal used when the control device determines that the wind velocity measured by the anemovane is equal to or less than the first threshold value.

7. The wind power generation system according to claim 1, wherein when the control device determines that the wind velocity measured by the anemovane is equal to or greater than the second threshold value, the control device further controls the rotational speed of the rotating pedestal based on the wind velocity measured by the anemovane.

8. The wind power generation system according to claim 1, wherein an outer periphery of the duct includes a wind direction adjuster on a rear side of the duct, the wind direction adjuster being shaped from a skirt part and an edge,
   the skirt part being composed of an inclined plane formed so as to angle away from the central axis toward an exhaust port side of the duct, and
   the edge being connected to the skirt part and having a surface extending from the skirt part away from the central axis and being substantially perpendicular to the central axis.

9. The wind power generation system according to claim 1, wherein the first threshold value is 30 m/s, and the second threshold value is 40 m/s.

10. The wind power generation system according to claim 1, wherein the first threshold value is 20 m/s, and the second threshold value is 60 m/s.

11. A control method to be executed in a wind power generation system, the wind power generation system comprising:
   a wind power generation apparatus that includes at least:
      a duct having a longitudinal cross section formed in a substantial streamline shape, the longitudinal cross section being taken along a central axis of the duct,
      an impeller placed in the duct, and
      a power generator that generates power by rotation of the impeller;
   an anemovane installed and configured to measure a wind direction and a wind velocity in a vicinity of the wind power generation apparatus;
   a rotating pedestal that supports the wind power generation apparatus so as to be rotatable along a supporting surface; and
   a control device that controls a rotational angle of the rotating pedestal based on the wind direction and/or the wind velocity measured by the anemovane;
   the control method comprising:
   controlling the rotating pedestal to not rotate when the wind velocity measured is between a first threshold value indicating a first value of excessive wind velocity and a second threshold value indicating a second value of excessive wind velocity that is higher than the first value of excessive velocity;
   increasing a rotational speed of the rotating pedestal when the wind velocity measured is equal to or less than the first threshold value and the wind velocity measured is decreasing; and
   decreasing the rotational speed of the rotating pedestal when the wind velocity measured is equal to or less than the first threshold value and the wind velocity measured is increasing,
   wherein the first value of excessive wind velocity indicates a wind velocity that gives an excessive burden on the wind power generation apparatus, and
   wherein the second value of excessive wind velocity indicates a wind velocity sufficient to destroy the wind power generation apparatus.

* * * * *